United States Patent [19]

Barie, Jr. et al.

[11] 4,338,171

[45] Jul. 6, 1982

[54] PHOTOPOLYMERIZABLE COMPOSITIONS

[75] Inventors: Walter P. Barie, Jr., Glenshaw, Pa.; Thomas F. Huemmer; Pallavoor R. Lakshmanan, both of Houston, Tex.

[73] Assignee: Gulf Oil Corporation, Pittsburgh, Pa.

[21] Appl. No.: 159,755

[22] Filed: Jun. 16, 1980

[51] Int. Cl.$^3$ ............................................. C08F 2/50
[52] U.S. Cl. ........................ 204/159.15; 204/159.19; 204/159.23; 524/776; 524/850; 524/852; 524/854
[58] Field of Search ............... 204/159.23, 159.15, 204/159.19

[56] References Cited

U.S. PATENT DOCUMENTS

| | | | |
|---|---|---|---|
| 3,728,377 | 4/1973 | Kelly et al. | 204/159.24 |
| 3,759,807 | 9/1973 | Osborne et al. | 204/159.15 |
| 3,926,638 | 12/1975 | Rosen et al. | 204/159.15 |
| 4,017,652 | 4/1977 | Gruber | 204/159.23 |
| 4,180,599 | 12/1979 | Wolpert et al. | 204/159.22 |
| 4,199,420 | 4/1980 | Photis | 204/159.23 |

FOREIGN PATENT DOCUMENTS 1223463  2/1971  United Kingdom .

*Primary Examiner*—John C. Bleutge
*Assistant Examiner*—A. H. Koeckert
*Attorney, Agent, or Firm*—Richard L. Kelly

[57] ABSTRACT

Coating compositions are provided which consist of a polymerizable ethylenically unsaturated material having included therein as a photoinitiator a di- or tetra-ester of 3,4,3',4'-benzophenone tetracarboxylic acid or a diester of 4,4'-benzophenone dicarboxylic acid.

8 Claims, No Drawings

PHOTOPOLYMERIZABLE COMPOSITIONS

BACKGROUND OF THE INVENTION

Photopolymerization of unsaturated compositions wherein a photoinitiating compound is included in the polymerizable mass is well known in the art. The process has many advantages over thermal polymerization and is particularly useful where long holding life, combined with rapid hardening at low temperature, is desirable. Photoinitiating compounds must absorb light and utilize the energy so acquired to initiate polymerization.

A large number of compounds have been found useful as photoinitiators for the polymerization of unsaturated compounds. Among those heretofore in most common usage in industry are the benzoin ethers of primary and secondary alcohols such as methyl alcohol, ethyl alcohol, isopropyl alcohol and isobutyl alcohol.

While particular industrial applications often dictate certain requisite characteristics, the primary determinants of universal application in the selection of a suitable photoinitiating compound are its level of reactivity and its effect upon storage stability when combined with the photopolymerizable medium wherein it is to function. This latter characteristic is significant in view of the desirability of one-component systems which will not gel prior to use.

While compounds in common use as photoinitiators do effect rates of polymerization which are industrially acceptable and render photopolymerization superior to thermal polymerization in various applications, methods of achieving increased polymerization rates with increased stability are constantly being sought. Improved photoinitiators are particularly desirable since photopolymerization techniques are gaining increasingly widespread acceptance due to the inherently lower equipment costs, reduction of volatile emissions and reduced energy consumption which attend their use.

Thus, the ethers of benzoin, which are widely used as photoinitiating compounds, are not wholly satisfactory with regard to the one-component system storage stability factor. Any unsaturated system to which a benzoin ether is added has considerably diminished dark storage stability and will gel prematurely. Various attempts have been made to remedy this deficiency of the benzoin compounds by including stabilizing additives in the polymerization system. Thus, U.S. Pat. No. 3,819,495 discloses the addition of organic chlorine containing compounds and copper compounds as a stabilization system, while U.S. Pat. No. 3,819,496 teaches the use of organic chlorine compounds with iron and/or manganese compounds for that purpose. Many other stabilizers have been suggested and, while some improvements have been achieved in the stability of unsaturated systems containing benzoin-type photoinitiators, the necessity of incorporating stabilizing additives raises the cost of such systems appreciably, while the results are still not wholly satisfactory.

Thus, various aromatic compounds have been proposed as photoinitiators for unsaturated compounds. For example, U.S. Pat. No. 3,715,293 teaches the use of acetophenone compounds such as 2,2-diethoxyacetophenone, while a series of patents including U.S. Pat. Nos. 3,926,638; 3,926,639; 3,926,640; 3,926,641; 4,022,674; 4,004,998; 4,008,138; and 4,028,204 describe complex compounds derived from benzophenone. As an example of the benzophenone-derived materials, U.S. Pat. No. 4,004,998 describes photoinitiators made by reacting carboxy-substituted benzophenones with hydroxyl-containing polyethylenically unsaturated esters, while U.S. Pat. Nos. 3,926,639 and 4,028,204 describe a benzophenone substituted with a carboxy group and an ester group which is reacted with certain resins, such as alkyds, polyesters, polyethers, polyamides and epoxies, to provide the photoinitiator.

U.S. Pat. No. 4,180,599 discloses certain unsaturated esters prepared by esterifying 3,4,3',4'-benzophenone tetracarboxylic acid with beta-hydroxyethyl acrylate esters. These esters contain four acrylate moieties per mol and are characterized as a dual-purpose photoinitiator and crosslinking agent for UV-curable coatings.

Another approach is disclosed in U.S. Pat. No. 3,759,807 where certain benzophenones which must be used with activators are disclosed. Also representative of benzophenone systems is Brit. Pat. No. 1,223,463 which teaches the addition of diketones, such as m-benzoylbenzophenone, or ethylene glycol bis(p-benzoylbenzoate), to nylon to give photosensitive materials suitable for the preparation of printing plates.

In U.S. Pat. No. 4,017,652, ethyl benzoylbenzoate is disclosed as a photosensitizer which must be used in connection with a photoinitiator such as a benzoin ether.

With regard to rate of polymerization and the dark storage stability of the uncured system, none of the most widely used photoinitiating compounds is wholly acceptable in unsaturated systems.

SUMMARY OF THE INVENTION

It has been discovered that polymerizable unsaturated compounds which contain certain esters, particularly ether-esters, of either 4,4'-benzophenone dicarboxylic acid, or 3,4,3',4'-benzophenone tetracarboxylic acid have good stability when stored in darkness and cure rapidly when exposed to ultraviolet light.

DETAILED DESCRIPTION OF THE INVENTION

The compositions of the present invention typically will contain 50–97 weight % of the polymerizable unsaturated compound and, correspondingly, about 50–3 weight % of the photoinitiating ester. The photoinitiating esters employed in the invention have relatively low viscosities for molecules of their molecular bulk. In addition, they function well as plasticizers for cured, cross-linked films prepared from many polymerizable unsaturated compounds. For this reason, the photoinitiating esters typically will be employed in amounts of at least 10 weight % of the total composition, typically 10–50 and more preferably 20–40 weight % of the total composition, with the polymerizable unsaturated compounds constituting the balance of the composition.

The polymerizable ethylenically unsaturated compounds employed in the compositions of the present invention can be any of those employed in the photoinitiated coating compositions reported in the prior art. Typically, these materials will be complex esters or ethers containing two or more vinyl or allyl groups such as diallyl phthalate, diallyl maleate, diallyl fumarate, triallyl cyanaurate, triallyl phosphate, ethylene glycol dimethacrylate, glycerol trimethacrylate, pentaerythritol triacrylate, pentaerythritol tetraacrylate, hexanediol-1,6 diacrylate, trimethylolpropane triacrylate, methacrylic acid anhydride, and allyl ethers of polyhydroxy compounds such as ethylene glycol diallyl ether, pentaerythritol tetraallyl ether, and the like. Nonterminally unsaturated compounds such as diethyl fumarate can similarly be used. Many proprietary resins containing terminal allyl and acrylate groups are commercially available and can be employed. Many of the resins are modified urethane and epoxy resins. Monomers containing a single polymerizable group also can be included in compositions of the invention. Examples of suitable members of this class include acrylonitrile, methacrylonitrile, methyl acrylate, ethyl acrylate, methyl methacrylate, isobutyl methacrylate, 2-ethylhexyl acrylate, methacrylamide, methyl alpha-chloroacrylate, vinyl acetate, vinyl pyrrolidone, and N-isobutoxyacrylamide.

The photoinitiating esters employed in the invention are of two chemical types. The first group consists of esters of 3,4,3',4'-benzophenone tetracarboxylic acid (BTCA) having the formula:

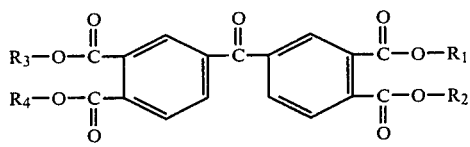

where each of $R_1$, $R_2$, $R_3$, and $R_4$ is independently selected from the group consisting of a hydrogen atom, an alkyl group containing from about 3 to about 18 carbon atoms and an alkoxy ether moiety having the structure:

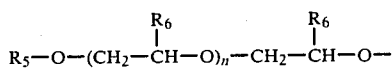

where $R_5$ is an alkyl group containing up to about 18 carbon atoms, $R_6$ is hydrogen or a methyl group, and n is zero or a small integer, with the further provision that not more than 1 of $R_1$ and $R_2$ and not more than 1 of $R_3$ and $R_4$ is hydrogen.

The second group consists of diesters of 4,4'-benzophenone dicarboxylic acid (BDCA) having the formula:

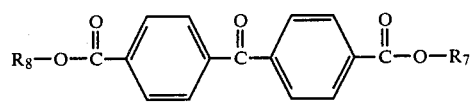

where each of $R_7$ and $R_8$ is independently selected from the group consisting of an alkyl group containing from about 3 to about 18 carbon atoms and an alkoxy ether moiety of the structure:

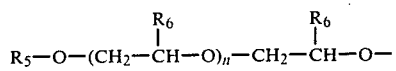

where $R_5$ is an alkyl group containing up to about 18 carbon atoms, $R_6$ is hydrogen or a methyl group and n is zero or a small integer. For reasons subsequently developed, compositions containing the diesters of BDCA have superior performance characteristics. This is particularly the case when the $R_7$ and $R_8$ substituents are the alkoxy ether moiety.

Examples of suitable members of the above classes include the following:

the dibutyl ester of BTCA
the tetrabutyl ester of BTCA
the di-lauryl ester of BTCA
the tetralauryl ester of BTCA
the diamyl ester of BDCA
the di-n-octyl ester of BDCA Other examples include ether-esters obtained by esterifying either BTCA or BDCA with the alkyl ethers of ethylene glycol, diethylene glycol, tripropylene glycol, and the like.

The photoinitiating esters employed in the invention can be synthesized readily from known chemicals. The esters of BTCA are readily prepared by esterifying the commercially available dianhydride of BTCA. The esters of BDCA are prepared by esterification of BDCA. The esterification reactions go readily employing known esterification techniques.

A significant advantage of the compositions of the invention is that they cure well in air without requiring the addition of an amine type cure synergist as is required with many prior art compositions. The freedom from use of a cure synergist provides systems whose curing times and characteristics can be controlled more readily.

The photoinitiating esters employed herein are all liquids. In addition, they are miscible with the curable resin systems of interest in all proportions. The viscosity of the photoinitiating esters can be controlled within wide ranges by proper selection of the esterifying alcohol and the degree of esterification with the BTCA species. The viscosity data for representative esters of BTCA are shown in Table I.

TABLE I

Viscosities of BTDA Ester Derivatives

| R-Moiety | Degree of Substitution | Viscosity cps | Temp °C. |
|---|---|---|---|
| Octyl | 2 | 17,600 | 50 |
| Diethyleneglycol butyl ether | 2 | 4,650 | 50 |
| Lauryl ethoxylate | 2 | 2,100 | 50 |
| Octyl | 4 | 1,008 | 25 |
| Diethyleneglycol monobutyl ether | 4 | 219 | 25 |

The ability to control viscosity of the compositions over a wide range is of considerable importance. With many systems, a low viscosity liquid photoinitiator provides a desirable degree of flexibility in coating formulations, since greater levels of other higher viscosity components can be tolerated, i.e., unsaturated oligomers or polyfunctional monomers, without an unreasonably high viscosity in the ultimate composition. Lower viscosities are industrially important for ease of application. Use of higher levels of the more viscous polyfunctional monomers permits higher line speeds, especially in air curing formulations.

The effectiveness of the photoinitiating esters in accelerating the cure rate of the compositions of the invention is a function of their structure. The diesters of BTCA give more rapid cures than do the corresponding tetraesters. The diesters of BDCA provide significantly faster cures than the corresponding esters of BTCA. The relative absorptivity of certain butyl Carbitol* (butyl ether of diethylene glycol) esters of BTCA and BDCA at the 25 mμ region of the UV spectrum, as compared with benzophenone, is shown in Table II.

*Carbitol is a trade name of Union Carbide Corporation.

TABLE II

| Ester | Relative Absorptivity |
| --- | --- |
| Benzophenone Control | 100 |
| Tetraester of BTCA | 110 |
| Diester of BTCA | 120 |
| Diester of BDCA | 160 |

The performance and properties of the compositions of the invention were evaluated by curing coatings. Most of the coatings were laid down on Leneta charts with a No. 4 wire rod. The coatings were cured in a QC Processor Model 1202 AN supplied by PPG Industries, Inc. The variables studied were line speed and the power density supplied by the mercury vapor lamps. The power density of the lamps is best expressed in watts per linear inch of lamp. For brevity, in the subsequent discussions, the power density will be expressed simply as watts/inch. The surface cure was determined by a simple touch test. Where the film surface was tack-free to the touch, the film cure then was measured by determining the number of rubs that were required to life the film from the substrate using an acetone impregnated cotton swab.

The other tests performed on the cured films were conventional in the coating arts. By way of example, pencil hardness values were determined by ASTM D3363-74. An adhesion test consisted of applying Scotch brand cellophane tape to the coating, lifting the tape, and noting the percent (if any) of the coating lifted by the tape. Solvent resistance was measured by placing a segment of fine filter paper on the coating, saturating the paper with the solvent, placing a watch glass over the filter paper, and permitting the assembly to set for at least 16 hours at ambient temperature. The watch glass and filter paper are removed and the film is examined visually to note any damage.

The following examples are set forth to illustrate the principle and practice of the invention to those skilled in the art. Where parts and/or percentages are set forth, they are parts or percentages on a weight basis unless otherwise specified.

EXAMPLE 1

Several UV curable coating compositions were prepared from trimethylolpropane triacrylate (TMPTA), hexanediol-1, 6-diacrylate (HDDA) and the di-n-octyl ester of BTCA. The formulations prepared are shown in Table III.

TABLE III

| Composition | A | B | C | D | E | F |
| --- | --- | --- | --- | --- | --- | --- |
| Component | | | | | | |
| TMPTA (1) | 80 | 65 | 60 | 15 | 50 | 32.5 |
| HDDA (2) | — | — | — | 50 | 15 | 32.5 |
| Ester (3) | 20 | 35 | 40 | 35 | 35 | 35 |

(1) TMPTA = Trimethylolpropane triacrylate
(2) HDDA = Hexanediol-1,6-diacrylate
(3) Di-n-octyl ester of BTCA Each of the coatings was coated onto a Leneta chart with a #4 wire rod to lay down a coating approximately 0.4 mil thick. The coatings were driven through the UV Processor at a speed of 100 ft/min and at a power density of 200 watts/inch. All of the films were tack-free to the touch. The film cure was determined by measuring the number of rubs with an acetone impregnated cotton swab required to lift the film from the substrate. The data are shown in Table IV.

TABLE IV

| Composition | Surface Cure | Film Cure |
| --- | --- | --- |
| A | Tack-Free | 50 |
| B | Tack-Free | 30 |
| C | Tack-Free | 20 |
| D | Tack-Free | 15 |
| E | Tack-Free | 45 |
| F | Tack-Free | 30 |

EXAMPLE 2

UV curable coating compositions were prepared from trimethylolpropane triacrylate, hexanediol-1,6-diacrylate and the tetra-n-octyl ester of BTCA. The formulations prepared are shown in Table V.

TABLE V

| Composition | A | B | C |
| --- | --- | --- | --- |
| Component | | | |
| TMPTA (1) | 60 | 50 | 32.5 |
| HDDA (2) | — | 15 | 32.5 |
| Ester (3) | 40 | 35 | 35 |

(1) TMPTA = Trimethylolpropane triacrylate
(2) HDDA = Hexanediol-1,6-diacrylate
(3) Tetra-n-octyl ester of BTCA Each of the coatings was tested as described in Example 1. The data are shown in Table VI.

TABLE VI

| Composition | Surface Cure | Film Cure |
| --- | --- | --- |
| A | Tack-Free | 10 |
| B | Tack-Free | 15 |
| C | Tack-Free | 15 |

The data of Tables IV and VI suggested that diesters of BTCA give better cures than the corresponding tetraesters.

EXAMPLE 3

Three coating compositions were prepared and contained 60, 70 and 80 weight % of TMPTA and, correspondingly, 40, 30 and 20 weight % of the tetra-n-propyl ester of BTCA. A fluorocarbon flow additive (FC-430 supplied by 3M) was added to each in the amount of 0.1 weight %. The compositions were coated onto a particle board substrate with a 14 wire rod to deposit a coating about one mil thick. The coating was cured at a line speed of 40 ft/min and at a power density of 200 watts/inch. Each film was tack-free and had a film cure equivalent to 50 acetone rubs. None of the films was damaged by water or a 50/50 water-ethanol mixture. None of the films was lifted from the substrate by Scotch brand cellophane tape. The film containing 80 weight % of the TMPTA was noticeably harder than the other two films, as measured by a pencil hardness test.

EXAMPLE 4

Several coating compositions were prepared having the formulations shown in Table VI

TABLE VI

| Composition | A | B | C | D |
| --- | --- | --- | --- | --- |
| Component | | | | |
| TMPTA (1) | 70 | 50 | 70 | 50 |
| Proprietary Resin A (2) | 10 | 30 | — | — |
| Proprietary Resin B (3) | — | — | 10 | 30 |

TABLE VI-continued

| Composition | A | B | C | D |
|---|---|---|---|---|
| Ester (4) | 20 | 20 | 20 | 20 |

(1) TMPTA = Trimethylolpropane triacrylate
(2) Acrylated epoxy resin designated as DRH-370 (supplied by Shell Chemical)
(3) Acrylated urethane resin designated as ZL 783 (supplied by Thiokol Chemical Co.)
(4) Tetra-n-octyl ester of BTCA Each composition was coated onto particle board with a #14 wire rod. Each composition was cured at a line speed of 40 ft/min and a power density of 200 watts/inch. All of the films were tack free to the touch and survived 50 acetone rubs. All of the films were resistant to damage by water and 50/50 water-ethanol mixtures.

EXAMPLE 5

Two compositions were prepared containing 80 weight % of TMPTA and 20 weight % of a tetraester of BTCA. Composition A contained the n-octyl ester. Composition B contained the ester derived from butyl Carbitol (the butyl ether of diethylene glycol). The compositions were coated onto Leneta charts with a #4 wire rod and cured at line speeds of 50, 100, 200, and 400 ft/min and at power densities of 200 and 300 watts/inch. The number of acetone rubs required to lift the film from the substrate are shown in Table VII.

TABLE VII

| Composition | Line Speed/Power Density | | | | | | | |
|---|---|---|---|---|---|---|---|---|
| | 50 | | 100 | | 200 | | 400 | |
| | 200 | 300 | 200 | 300 | 200 | 300 | 200 | 300 |
| A | 18 | 45 | 15 | 40 | — | — | — | — |
| B | 50 | — | — | 50 | 40 | 50 | — | 50 |

The above data demonstrate that the presence of an ether oxygen atom in the alcohol moiety of the ester significantly increases the cure rate as compared with a corresponding alkyl moiety.

EXAMPLE 6

A coating composition was prepared which contained 50 weight % of HDDA, 25 weight % of the proprietary acrylated epoxy resin DRH-370 (described in footnote 2 of Table VI), and 25 weight % of the di-butyl Carbitol ester of BTCA. The composition, when coated onto a Leneta chart with a #4 wire rod, cured to a tack free film at a line speed of 500 ft/min at a power density of 300 watts/inch.

EXAMPLE 7

A coating composition was prepared containing 50 weight % HDDA and 50 weight % of the di-butyl Carbitol ester of BTCA. When coated onto a Leneta chart with a #4 wire rod, the composition cures to a tack free film at a speed of 150 ft/min at a power density of 300 watts/inch. This performance equals or exceeds that of the proprietary acrylated epoxy resin DRH-370, when formulated with a photoinitiator which is (a) benzoin isopropyl ether, (b) a benzophenone/amine synergist combination, or (c) a highly regarded proprietary photoinitiator sold by Eastman Chemicals under the designation FI-4.

EXAMPLE 8

A binary composition containing 50 weight % of HDDA and 50 weight % of the di-butyl carbitol ester of BTCA was coated onto a Leneta chart with a #4 wire rod. The composition cured to a tack free film at a line speed of 800 ft/min at a power density of 300 watts/inch.

EXAMPLE 9

The composition of Example 8 was cured at varying line speeds at a linear power density of 200 watts/inch to provide tack free film having the film cures shown in Table VIII.

TABLE VIII

| Line Speed | Film Cure, Acetone Rubs |
|---|---|
| 50 | 24 |
| 100 | 10 |
| 200 | 3 |

The composition then was modified by adding thereto 1 weight % and 4 weight % of methyl diethanolamine synergist. The modified compositions, even when cured at a line of 50 ft/min at a power density of 200 watts/inch did not give completely tack free films. These data suggest that amine synergists are not required with the compositions of the invention. They may in fact have a detrimental effect.

EXAMPLE 10

A composition was prepared containing 80 weight % TMPTA and 20 weight % of the tetrabutyl Carbitol ester of BTCA. To an aliquot of the composition was added 4 weight % of methyl diethanolamine. The two compositions were coated onto Leneta charts with a #4 wire rod. The compositions were cured at line speeds of 50, 100 and 200 ft/min at power densities of 100 and 200 watts/inch. All of the films were tack free. The film cure data, measured by acetone rubs, indicated that better cures were obtained in the absence of the amine synergist.

EXAMPLE 11

Several coating compositions having the formulations shown in Table IX were prepared.

TABLE IX

| Composition | A | B | C | D | E | F | G |
|---|---|---|---|---|---|---|---|
| Component | | | | | | | |
| TMPTA (1) | 80 | — | 40 | 68 | — | 68 | — |
| HDDA (2) | — | 80 | 40 | — | 68 | — | 68 |
| Vinyl acetate | — | — | — | 12 | 12 | — | — |
| Isobornyl acrylate | — | — | — | — | — | 12 | 12 |
| Ester (3) | 20 | 20 | 20 | 20 | 20 | 20 | 20 |

(1) TMPTA = Trimethylolpropane triacrylate
(2) HDDA = Hexanediol-1,6-diacrylate
(3) Tetrabutyl Carbitol ester of BTCA When coated onto Leneta charts with a #4 wire rod and cured at 200 ft/min at a power density of 200 watts/inch, each composition gave a tack free film. The film cure data, shown by acetone rubs, are shown in Table X.

TABLE X

| Composition | Film Cure (acetone rubs) |
|---|---|
| A | 50 |
| B | 20 |
| C | 50 |
| D | 50 |
| E | 29 |
| F | 50 |
| G | 15 |

EXAMPLE 12

A first resin series was prepared by adding 3.8, 7.6 and 15.2 weight % of the dibutyl Carbitol ester of BTCA to a resin system containing 50 weight % of HDDA and 50 weight % of acrylated epoxy resin DRH 370. A second parallel series was prepared employing the tetrabutyl Carbitol ester of BTCA. A control was prepared by adding 3.8 weight % of benzophenone to the resin system. The resins were coated onto Leneta charts with a #4 wire rod and cured at line speeds of 20 and 100 ft/min at a power density of 200 watts/inch. The control resins containing benzophenone did not cure at a line speed of 20 ft/min. All of the resins containing the diester cured to tack free films at 20 of t/min. The resin containing 15.2 weight % of the diester cured to a tack free film at 100 ft/min. The resins containing the tetraester required 7.6 weight % of the ester to cure to a tack free film at 20 ft/min. Even when containing 15.2 weight % of the tetraester, the cured films were not completely tack free when cured at 100 ft/min. These data demonstrate that the diester of BTCA provides superior cure rates as compared with corresponding tetraester. The data further demonstrate that the esters containing the alkoxy ether moiety give superior performance as compared with the alkyl esters.

EXAMPLE 13

Several coating compositions were prepared having the formulations shown in Table XI.

TABLE XI

| Composition | A | B | C | D |
|---|---|---|---|---|
| Component |  |  |  |  |
| TMPTA (1) | 0 | 10 | 20 | 50 |
| Proprietary Resin (2) | 50 | 45 | 40 | 25 |
| Ester (3) | 50 | 45 | 40 | 25 |

(1) TMPTA = Trimethylolpropane triacrylate
(2) Acrylated epoxy resin designated as DRH-370 (supplied by Shell Chemical)
(3) Tetrabutyl Carbitol ester of BTCA The resins were coated onto Leneta charts with a #4 wire rod and cured at different speeds and power densities to provide tack free films. The test conditions and the film cure data are shown in Table XII.

TABLE XII

| Composition | Line Speed ft/min | Power Density, watts/inch | Film Cure Acetone Rubs |
|---|---|---|---|
| A | 50 | 200 | 6 |
| B | 50 | 200 | 25 |
| C | 50 | 200 | 45 |
| D | 50 | 200 | 50 |
| A | 100 | 200 | 4 |
| B | 100 | 200 | 6 |
| C | 100 | 200 | 9 |
| D | 100 | 200 | 35 |
| A | 200 | 200 | 4 |
| B | 200 | 200 | 5 |
| C | 200 | 200 | 6 |
| D | 200 | 200 | 18 |
| B | 400 | 300 | 4 |
| C | 400 | 300 | 16 |

EXAMPLE 14

The coating compositions shown in Table XIII were prepared.

TABLE XIII

| Composition | A | B | C | D |
|---|---|---|---|---|
| Component |  |  |  |  |
| Proprietary Resin (1) | 12.5 | 37.5 | 12.5 | 37.5 |
| TMPTA (2) | 50 | 50 | — | — |
| HDDA (3) | — | — | 50 | 50 |
| Ester (4) | 37.5 | 12.5 | 37.5 | 12.5 |

(1) Acrylated epoxy resin
(2) TMPTA = Trimethylolpropane triacrylate
(3) HDDA = Hexanediol-1,6-diacrylate
(4) Tetrabutyl Carbitol ester of BTCA The compositions were coated onto Leneta charts with a #4 wire rod. The coatings were cured at varying line speeds and at a power density of 200 watts/inch. Tack free films were obtained in all cases. The film cure data are shown in Table XIV.

TABLE XIV

| Composition | Line Speed ft/min | Film Cure, Acetone Rubs |
|---|---|---|
| A | 50 | 15 |
| B | 50 | 50 |
| C | 50 | 15 |
| D | 50 | 50 |
| A | 100 | 10 |
| B | 100 | 25 |
| C | 100 | 9 |
| D | 100 | 45 |
| A | 200 | 6 |
| B | 200 | 15 |
| C | 200 | 5 |
| D | 200 | 3 |

EXAMPLE 15

A coating composition was prepared containing 80 weight % HDDA and 20 weight % of the dibutyl Carbitol ester of BDCA. A coating on a Leneta chart cured at a line speed of 100 ft/min and a power density of 200 watts/inch was tack free and had a film cure of 35 acetone rubs. A second coating composition was prepared by substituting TMPTA for HDDA. When cured under identical conditions, it gave a tack free film having a film cure of 50 acetone rubs.

EXAMPLE 16

Two coating compositions were prepared. Composition A contained 80 weight % of HDDA and 20 weight % of the dibutyl Carbitol ester of BDCA. Composition B contained 80 weight % of TMPTA and 20 weight % of the same ester. Coatings were laid down from each composition at varying thickness on paper (Leneta charts), particle board, steel and aluminum. The coatings were cured at varying line speeds at a power density of 200 watts/inch to provide tack free films. The film cure data are shown in Table XV.

TABLE XV

| Composition | Substrate | Film Thickener, mils | Line Speed ft/min | Film Cure, Acetone Rubs |
|---|---|---|---|---|
| A | Paper | 0.4 | 50 | 50 |
| A | Paper | 0.4 | 100 | 35 |
| A | Paper | 0.8 | 50 | 50 |
| A | Paper | 0.8 | 100 | 45 |
| A | Paper | 3.0 | 50 | 50 |
| A | Paper | 3.0 | 100 | 50 |
| B | Paper | 0.4 | 50 | 50 |
| B | Paper | 0.4 | 100 | 50 |
| B | Paper | 0.8 | 50 | 50 |
| B | Paper | 0.8 | 100 | 50 |
| B | Paper | 3.0 | 50 | 50 |

TABLE XV-continued

| Composition | Substrate | Film Thickener, mils | Line Speed ft/min | Film Cure, Acetone Rubs |
| --- | --- | --- | --- | --- |
| B | Paper | 3.0 | 100 | 50 |
| B | Paper | 0.4 | 200 | 50 |
| B | Paper | 0.4 | 400 | 40 |
| A | Particle Board | 0.8 | 50 | 50 |
| B | Particle Board | 0.8 | 50 | 50 |
| A | Steel | 0.4 | 100 | 8 |
| B | Steel | 0.4 | 100 | 23 |
| A | Aluminum | 0.4 | 100 | 9 |
| B | Aluminum | 0.4 | 100 | 20 |

The compositions of the invention have good storage life when stored in darkness. Each of the compositions shown in the examples will have a shelf life of at least six months at ambient temperature without a significant increase in viscosity.

The compositions of the invention, when tightly cured, develop a yellow color which fades with the passage of time. The relative development of color is that the tetraesters of BTCA > the diester of BTCA > the diester of BDCA. The yellow color which initially forms on curing can be masked significantly by including a soluble blue dye in the compositions.

What is claimed:

1. A photopolymerizable composition consisting essentially of about 50–90 weight % of a polymerizable unsaturated compound and, correspondingly, about 50–10 weight % of a photoinitiating ester selected from the group consisting of (a) an ester having the structure:

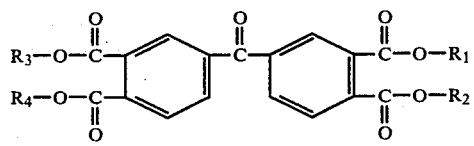

where each of $R_1$, $R_2$, $R_3$, and $R_4$ is independently selected from the group consisting of a hydrogen atom and an alkoxy ether moiety having the structure:

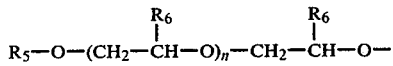

where $R_5$ is an alkyl group containing up to about 18 carbon atoms, $R_6$ is hydrogen or a methyl group, and n is zero or a small integer, with the further provision that not more than 1 of $R_1$ and $R_2$ and not more than 1 of $R_3$ and $R_4$ is hydrogen, and (b) an ester having the structure:

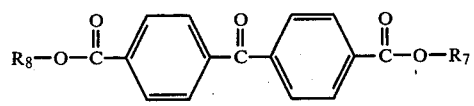

where each of $R_7$ and $R_8$ is an alkoxyl ether moiety of the structure described above.

2. A composition of claim 1 in which the photoinitiating ester has the structure:

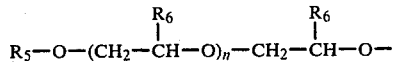

where each of $R_1$, $R_2$, $R_3$, and $R_4$ is independently selected from the group consisting of a hydrogen atom and an alkoxy ether moiety having the structure:

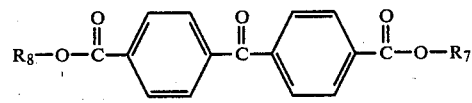

where $R_5$ is an alkyl group containing up to about 18 carbon atoms, $R_6$ is hydrogen or a methyl group, and n is zero or a small integer, with the further provision that not more than 1 of $R_1$ and $R_2$ and not more than 1 of $R_3$ and $R_4$ is hydrogen.

3. A composition of claim 1 in which the photoinitiating ester has the structure:

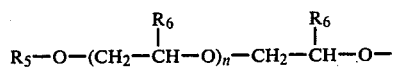

where each of $R_7$ and $R_8$ is an alkoxyl ether moiety of the structure:

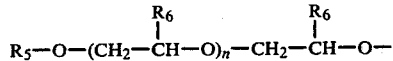

where $R_5$ is an alkyl group containing up to about 18 carbon atoms, $R_6$ is hydrogen or a methyl group and n is zero or a small integer.

4. A composition of claim 2 in which each of $R_1$, $R_2$, $R_3$, and $R_4$ is an alkoxy ether moiety having the structure:

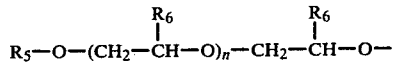

where $R_5$ is an alkyl group containing up to about 18 carbon atoms, $R_6$ is hydrogen or a methyl group, and n is zero or a small integer.

5. A composition of claim 2 in which one of $R_1$ and $R_2$ is a hydrogen atom, one of $R_3$ and $R_4$ is a hydrogen atom, and the remaining members of $R_1$, $R_2$, $R_3$, and $R_4$ are alkoxy ether moieties having the structure:

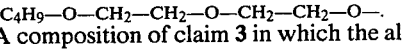

where $R_5$ is an alkyl group containing up to about 18 carbon atoms, $R_6$ is hydrogen or a methyl group, and n is zero or a small integer.

6. A composition of 2 or 4 in which each of $R_1$, $R_2$, $R_3$ an $R_4$ has the structure:

$C_4H_9-O-CH_2-CH_2-O-CH_2-CH_2-O-$.

7. A composition of claim 3 in which the alkoxy ether moieties have the structure:

$C_4H_9-O-CH_2-CH_2-O-CH_2-CH_2-O-$.

8. A composition of claim 1, 2, 3, 4 or 5 which consists essentially of 60–80 weight % of the polymerizable unsaturated compound and, correspondingly, 40–20 weight % of the photoinitiating ester.

* * * * *